April 28, 1925.

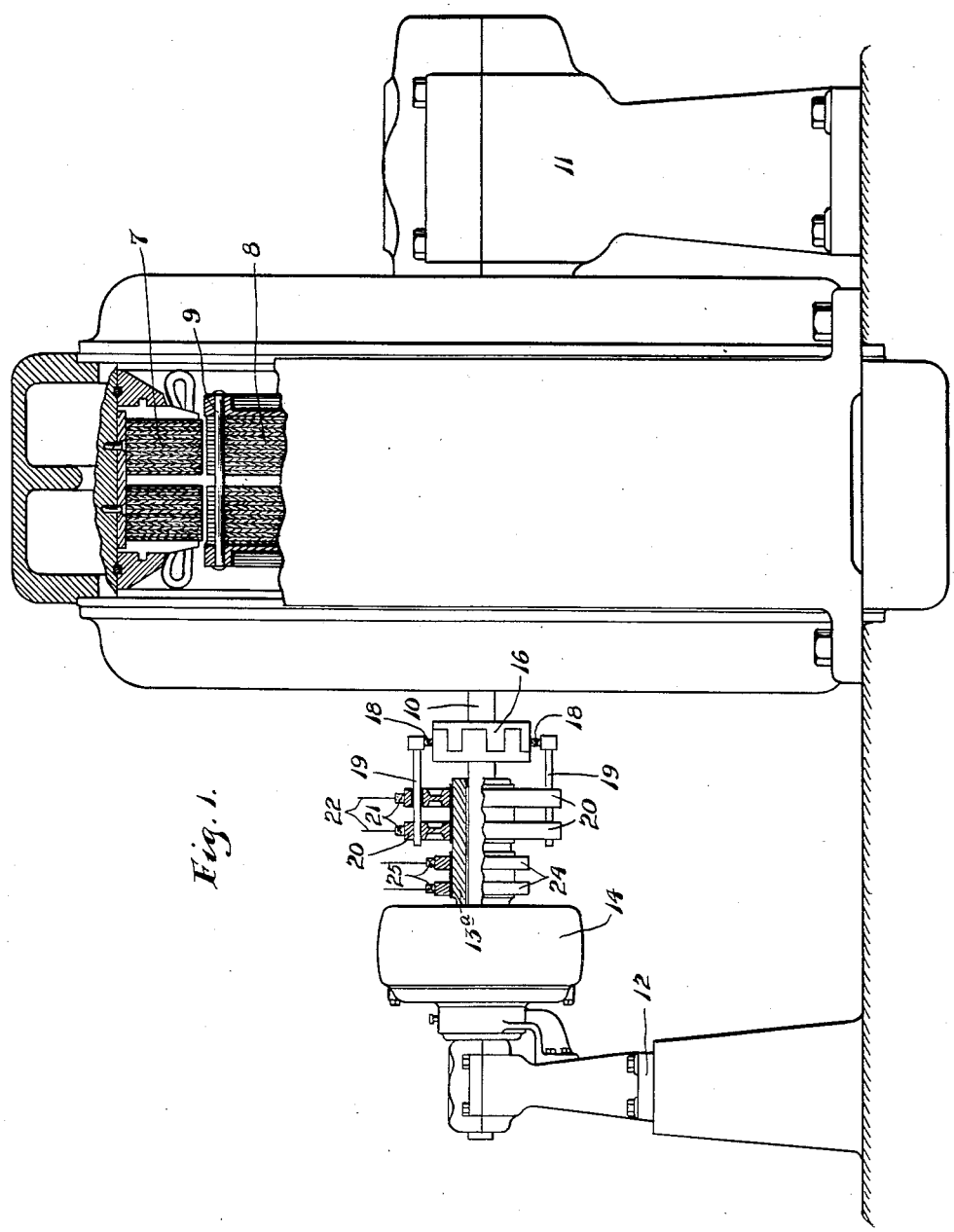

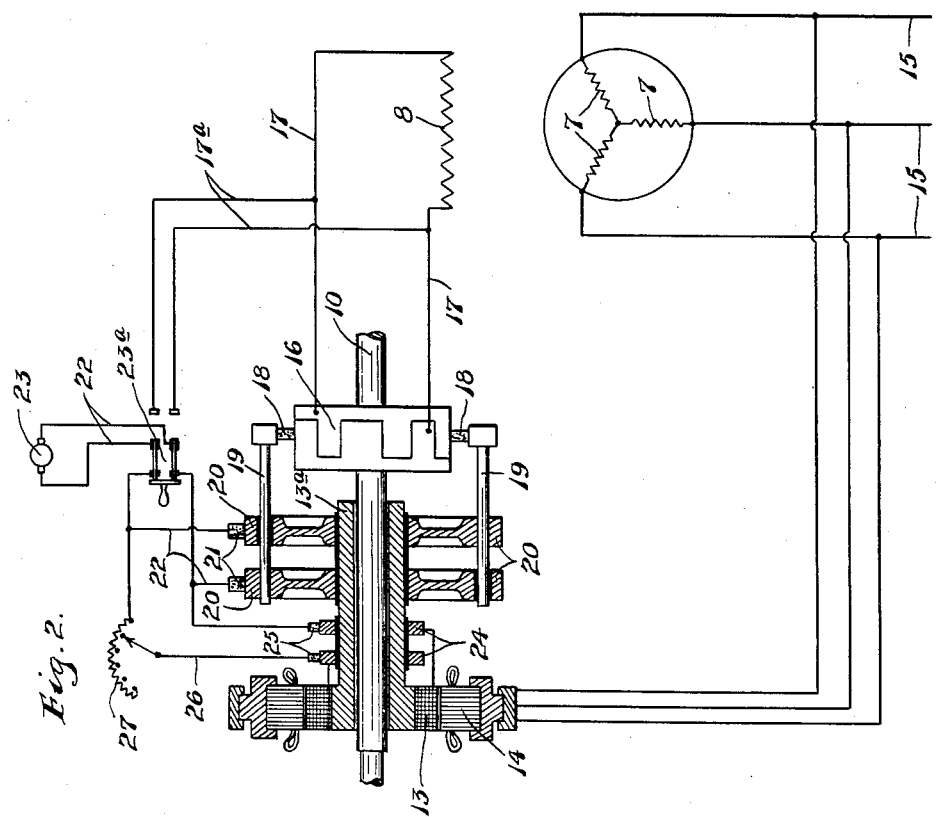

T. HIBBARD

SELF STARTING SYNCHRONOUS MOTOR

Filed Nov. 7, 1919  4 Sheets-Sheet 3

1,535,774

INVENTOR.
TRUMAN HIBBARD.
BY HIS ATTORNEYS.

April 28, 1925.
T. HIBBARD
SELF STARTING SYNCHRONOUS MOTOR
Filed Nov. 7, 1919    4 Sheets-Sheet 4
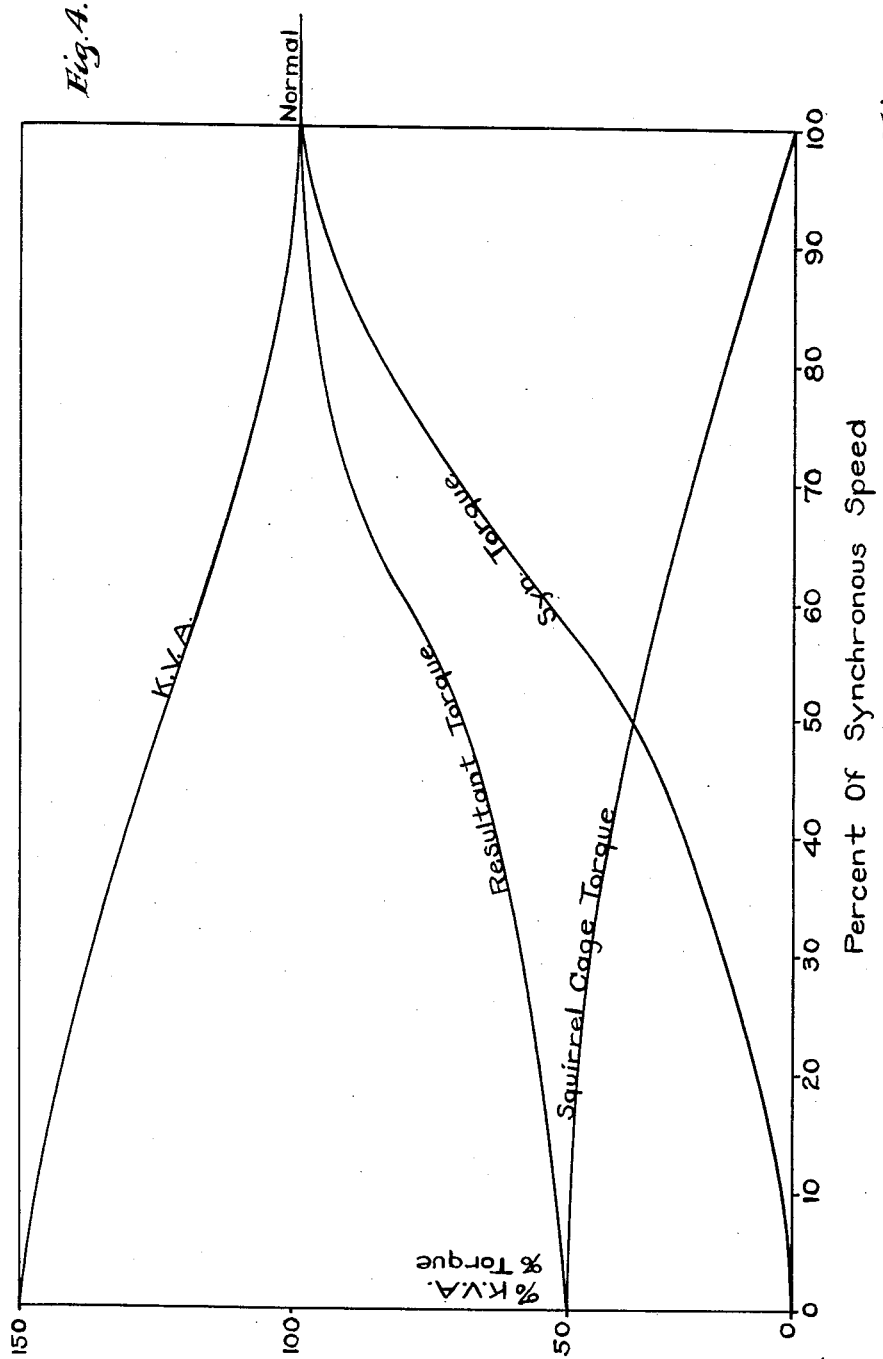
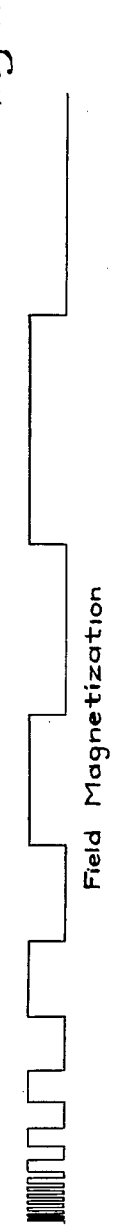
INVENTOR:
TRUMAN HIBBARD
BY
ATTORNEYS.

Patented Apr. 28, 1925.

1,535,774

UNITED STATES PATENT OFFICE.

TRUMAN HIBBARD, OF MINNEAPOLIS, MINNESOTA, ASSIGNOR, BY MESNE ASSIGNMENTS, TO ELECTRIC MACHINERY MFG. COMPANY, OF MINNEAPOLIS, MINNESOTA, A CORPORATION OF MINNESOTA.

SELF-STARTING SYNCHRONOUS MOTOR.

Application filed November 7, 1919. Serial No. 336,302.

*To all whom it may concern:*

Be it known that I, TRUMAN HIBBARD, a citizen of the United States, residing at Minneapolis, in the county of Hennepin and State of Minnesota, have invented certain new and useful Improvements in Self-Starting Synchronous Motors; and I do hereby declare the following to be a full, clear, and exact description of the invention, such as will enable others skilled in the art to which it appertains to make and use the same.

My invention relates to self-starting synchronous motors, and has for its object to provide improved means for starting such motors with load and bringing the same up to synchronous speed.

Particularly, this invention relates to polyphase self-starting synchronous motors having the usual damper windings and adapted to act as induction motors on starting and to run as synchronous motors when brought up to synchronous speed. In motors of this type, as is well known, there is ample torque in starting; but the torque decreases, under increasing speed, and becomes ineffective to pull full load at about fifty or sixty percent of synchronous speed. With about fifty percent full load, it is possible to bring the speed of the rotor so close to synchronous speed, while running as an induction motor, that when the field excitation is thrown on, the motor will pull into step at synchronism and commence to run as a synchronous motor, at which time, of course, the motor ceases to operate as an induction motor.

So far as I am aware, no means has hitherto been provided, whereby a self-starting synchronous motor, operating under full load, or anywhere near full load, will pull into step as its action is converted from that of an induction motor into that of a synchronous motor. My invention provides efficient means whereby this highly desired result is accomplished.

A commercial embodiment of my invention is illustrated in the accompanying drawings. A brief statement of the arrangement illustrated in said drawings is as follows:

A redirecting commutator, is preferably, as shown, carried by the shaft of the revolving field structure of the main synchronous motor, and co-operating commutator brushes, on a suitable brush carrier, are arranged to rotate around the axis of the redirecting commutator. These brushes are connected to a source of direct current excitation, and the commutator segments, are connected to the field terminals of the main motor. For rotating the brush carrier and brushes, I preferably employ a relatively small auxiliary synchronous motor that is electrically connected for rotation in synchronism with the main motor. The main synchronous motor has a damper winding so that it will start as an induction motor.

With the arrangement above outlined, the main motor with full load, may be started as an induction motor. When the motor, with full load, has reached about fifty percent synchronous speed, the auxiliary synchronous motor is thrown into action and will then move the commutator brushes at the full synchronous speed of the main motor, which, at such times, therefore, rotates the commutator brushes about twice as fast as the redirecting commutator is being rotated by the rotor of the main motor. Thus, the commutator, acting through the direct current excitation circuit, and the revolving field winding of the main motor, reverses the polarity of the field poles with a timed action that causes the field poles to co-operate with the rotating or advancing magnetic field of the stationary armature of the main motor, to produce a torque analogous to that of a direct current motor, and which is in addition to the torque produced by the induction motor action. This additional torque is sufficient to increase the speed of the main rotor, under full load, so nearly to synchronous speed that the gap to synchronism can be bridged and the main motor brought into synchronism with full load at synchronous speed.

My invention, in its preferred form, is illustrated in the accompanying drawings wherein like characters indicate like parts throughout the several views.

Referring to the drawings:

Fig. 1 is a view chiefly in side elevation but with some parts in vertical section, showing a main motor, auxiliary motor, redirecting commutator, and co-operating devices in an arrangement embodying my invention;

Fig. 2 is a view partly in diagrammatic plan and partly in horizontal section illustrating the same parts that are shown in Fig. 1;

Fig. 4 is a diagram illustrating various torque lines that are characteristic of the arrangement illustrated in the foregoing views;

Figure 6:
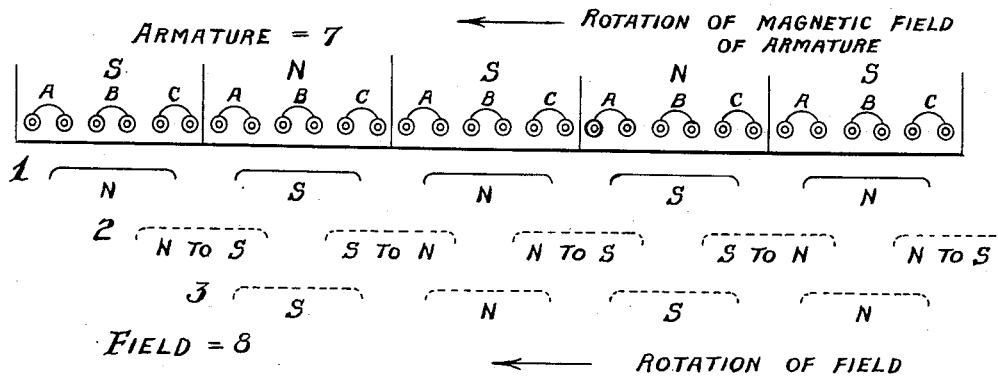

Fig. 5 is a diagram illustrating the varying frequency of the polarity change in the field magnets of the main motor in "pulling in" under the action of the redirecting commutator; and Fig. 6 is a diagrammatic view illustrating the polarity changes that take place in the magnets of the revolving field structure and in the magnetic field of the armature of the main motor under the action of the commutator.

Of the parts of the main synchronous motor, the numeral 7 indicates the stationary armature, the numeral 8' the revolving field structure having the customary damper winding 9, and the numeral 10 the rotor shaft which carries the rotary field 8. The construction of the main motor, with the exception of the redirecting commutator, herein described, is preferably standard. The rotor shaft 10 may be mounted in any suitable bearings, and, as shown, is mounted at one end to a heavy bearing pedestal 11, and at its extended end, in a pedestal 12, but other suitable bearings may be provided. The extended end of the rotor shaft 10 is shown in Figs. 1 and 2 as reduced, and rotatively mounted thereon is the revolving field structure 13 of an auxiliary synchronous motor, the stationary armature of which is indicated by the numeral 14. The stationary armatures 7 and 14 of the main and auxiliary synchronous motors are connected to the main line 15. The synchronous motors shown are of the three phase type and hence, of course, the main line comprises three line wires.

The redirecting commutator 16 is mounted on and carried by the rotor shaft 10. This redirecting commutator should have interlapped segments and its sectors are connected by leads 17 to the terminals of the rotor field windings 8 of the main synchronous motor.

Contact brushes 18 co-operate with the commutator 16, and these brushes, as shown, are supported by the ends of conducting rods 19 that are carried by a rotary brush carrier comprising a pair of collecting disks 20, which, in turn, are insulated from, but rigidly secured to an extended sleeve 13ª forming the rotor shaft of the auxiliary motor. The conducting rods 19 are electrically connected, each to one of the two collecting disks 13 and each is insulated from the other disk, as best shown in Fig. 2. Fixed contact brushes 21 engage the peripheries of the collecting disks 20 and by leads 22, are connected to a direct current exciter 23. The connections just described afford means for exciting the field winding of the main synchronous motor through the redirecting commutator. It is also desirable to excite the field of the auxiliary motor from the exciter 23, and hence, the sleeve 13ª of the rotary field 13 is provided with two collecting rings 24 insulated from each other but connected to the terminals of said field 13 in a well known manner. Suitably supported contact brushes 25 work on the collecting rings 24, and are connected in a shunt 26 across the circuit 22, preferably through a rheostat 27.

In starting, main motor switch 23ª is thrown over so as to connect leads 22 to exciter 23, as shown in Fig. 2. When the motor has attained synchronous speed, switch 23ª will be turned over, so as to connect exciter 23 to field 8 of the main motor, through leads 17ª—17. It will be understood, of course, that the impedance of the field circuit is ordinarily so high that the field current does not build up to a useful value until the motor speed has reached approximately one-half synchronous speed and, therefore, the operation of the system is quite satisfactory if the switch 23ª is not closed so as to connect leads 22 to the exciter 23 until after the motor speed has increased a certain extent. Furthermore, it is, of course, not necessary for the auxiliary motor to operate at synchronous speed until the switch 23 is closed so as to supply direct current to the brushes 18.

In the arrangement illustrated in the drawings so far described, the rotor of the auxiliary motor, while rotating the commutator brushes 18 at the full synchronous speed of the main motor will, itself, run at the same speed.

Figure 3:
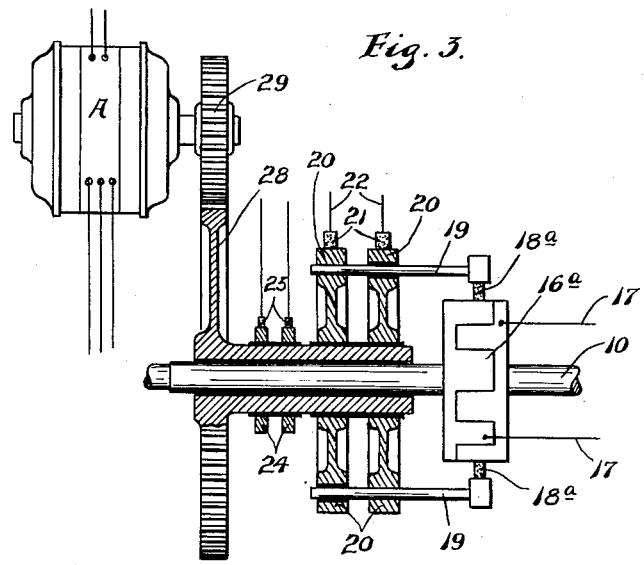
Fig. 3 is a view partly in plan and partly in horizontal section illustrating a modified arrangement of the auxiliary synchronous motor.

Fig. 3 illustrates an arrangement in which the auxiliary motor, indicated as an entirety by the character A, may be very small, designed to run at relatively high speed and to rotate the brush carrier at a lower speed but at the full synchronous speed of the main motor. In this arrangement, the commutator brushes 18ª are carried by a relatively large gear 28 that meshes with a pinion 29 on the rotor shaft of the auxiliary motor A. In this arrangement also, the redirecting commutator 16ª is the same as in the other views.

The diagrammatic view, Fig. 6, illustrates three stages, showing different relative positions of the rotating field structure with respect to the rotating magnetic field of the stator. In this diagrammatic view the three different steps are indicated, to-wit, position 1 indicates the condition of attraction before reversal; position 2 indicates condition at the moment of reversal; and position 3 indicates the condition of attraction after reversal. It will, of course, be understood that positions 2 and 3 should be the same distance from the rotating field as position 1, but have been offset laterally to avoid confusion.

In starting the motor, the main rotor lags behind the rotating magnetic field of the armature. When the revolving field winding has lagged to a certain degree behind this rotating magnetic field, repulsion exists, instead of attraction, due to the fields of like polarity being opposite each other. My invention changes this condition, so that when the rotating field approaches a position in which repulsion would exist, the current in the rotating field is reversed, thereby always providing attraction instead of repulsion. The poles of the revolving field structure will always then be of different polarity from the rotating magnetic field of the stator, and when synchronism is reached, both magnetic fields are electrically locked.

What I claim is:

1. The combination with a self-starting synchronous motor having a damper winding and adapted to be started as an induction motor, of means including a redirecting commutator driven with the rotor of said motor and having its field sectors connected to the field terminals of said motor, and independently rotated brushes co-operating therewith for reversing the polarity of the rotor magnets to produce a torque to enable the motor to pull into synchronism under substantially full load.

2. The combination with a self-starting synchronous motor having a revolving field structure and adapted to be started as an induction motor, of a source of direct current excitation in the field circuit of said motor, a redirecting commutator interposed in the connections between said source of direct current excitation and the field winding, and a set of independently rotated brushes co-operating with said commutator arranged to reverse the polarity of the field magnets of said motor, to thereby produce a torque, analogous to that of a direct current motor to enable the motor to pull into synchronism under substantially full load.

3. The combination with a self-starting synchronous motor having a damper winding and adapted to be started as an induction motor, of an auxiliary synchronous motor, a set of brushes connected to and driven by the rotor of said auxiliary motor, the rotors of said motors being mounted on a common shaft, a redirecting commutator driven with the rotor of said first mentioned motor and having its segments connected to the field terminals of said motor and co-operating with said set of brushes for reversing the polarity of the rotor magnets of the first mentioned motor to produce a torque to enable the motor to pull into synchronism under substantially full load.

4. The combination with a self-starting synchronous motor, of a two-part redirecting commutator driven with the rotor of said motor and having its sectors connected to the field terminals of said motor, commutator brushes, a source of direct current excitation connected to said brushes, and means for rotating said brushes at the synchronous speed of said motor.

5. The combination with a self-starting synchronous motor, of a two-part redirecting commutator driven with the rotor of said motor and having its field sectors connected to the field terminals of said motor, commutator brushes, an auxiliary synchronous motor electrically connected for rotation in synchronism with said main motor and a single source of direct current excitation connected to said brushes and to said auxiliary motor, the rotor of said auxiliary motor being connected to said commutator brushes for rotating the same.

6. The combination with a self-starting synchronous motor, of a redirecting commutator driven by the rotor of said motor and having its segments connected to the field terminals of said motor, commutator brushes, an auxiliary synchronous motor electrically connected for rotation in synchronism with said motor, said auxiliary motor having a rotor having an extended sleeve, a pair of slip rings carried thereby and insulated therefrom in which said brushes are mounted, one of said brushes being electrically connected to one of said rings and the other of the brushes being electrically connected to the other of said rings, and a source of direct current carrying excitation connected to said rings.

In testimony whereof I affix my signature in presence of two witnesses.

TRUMAN HIBBARD.

Witnesses:
 O. W. PADDOCK,
 ARTHUR P. PETERSON.